US012074395B2

(12) United States Patent
Wu et al.

(10) Patent No.: US 12,074,395 B2
(45) Date of Patent: Aug. 27, 2024

(54) BOARD END CONNECTOR AND CONNECTOR ASSEMBLY

(71) Applicant: Dongguan Luxshare Technologies Co., Ltd, Dongguan (CN)

(72) Inventors: ShengYu Wu, Dongguan (CN); RongZhe Guo, Dongguan (CN); XueHai Shen, Dongguan (CN); YiHeng Lin, Dongguan (CN); HongJi Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 76 days.

(21) Appl. No.: 18/145,679

(22) Filed: Dec. 22, 2022

(65) Prior Publication Data

US 2023/0129300 A1 Apr. 27, 2023

Related U.S. Application Data

(62) Division of application No. 17/221,278, filed on Apr. 2, 2021, now Pat. No. 11,621,519.

(30) Foreign Application Priority Data

Apr. 24, 2020 (CN) ......................... 202010334204.4
Sep. 24, 2020 (CN) ......................... 202011015371.9

(51) Int. Cl.
*H01R 13/627* (2006.01)
*H01R 24/60* (2011.01)

(52) U.S. Cl.
CPC ......... *H01R 13/6271* (2013.01); *H01R 24/60* (2013.01)

(58) Field of Classification Search
CPC ............................ H01R 13/6271; H01R 24/60
See application file for complete search history.

(56) References Cited

U.S. PATENT DOCUMENTS

D271,296 S 11/1983 Jones et al.
D316,400 S 4/1991 Morial et al.
(Continued)

FOREIGN PATENT DOCUMENTS

CN 210156592 U 3/2020
CN 210350162 U 4/2020
(Continued)

OTHER PUBLICATIONS

"OmniEdge™ ASM," Dongguan Luxshare Technology Co., Ltd., May 17, 2022, [accessed on Mar. 18, 2023], 5 pages total.

*Primary Examiner* — Oscar C Jimenez
(74) *Attorney, Agent, or Firm* — Birch, Stewart, Kolasch & Birch, LLP

(57) ABSTRACT

A board end connector and a connector assembly. The board end connector comprises a board end insulating body, a terminal module, and a housing. The board end insulating body comprises a board end plugging surface and a plugging slot. The plugging slot is disposed on the board end plugging surface and comprises two interference sidewalls which are oppositely disposed. The terminal module is disposed in the board end insulating body. The housing is disposed on one side of the board end insulating body. A plugging bump member is provided on one side of the housing. The plugging bump member is disposed in the plugging slot. An interfering bump is provided on at least one side of the plugging bump member. The interfering bump interferes with at least one of the two interference sidewalls to increase the holding force between the housing and the board end insulating body.

1 Claim, 15 Drawing Sheets

(56) References Cited

U.S. PATENT DOCUMENTS

| | | | | |
|---|---|---|---|---|
| D425,488 | S | 5/2000 | Byrd et al. | |
| D432,032 | S | 10/2000 | Monaco et al. | |
| D491,535 | S | 6/2004 | Chien | |
| D593,037 | S | 5/2009 | Shien-Tang | |
| D606,024 | S | 12/2009 | Chiang | |
| 8,348,701 | B1 * | 1/2013 | Lan | H01R 12/716<br>439/607.19 |
| D692,842 | S | 11/2013 | Mullert | |
| 9,496,657 | B1 | 11/2016 | Chang et al. | |
| 10,483,682 | B1 | 11/2019 | Yu | |
| D908,472 | S | 1/2021 | Zhang | |
| 10,886,649 | B1 * | 1/2021 | Yang | H01R 12/75 |
| 11,189,971 | B2 * | 11/2021 | Lu | H01R 12/75 |
| 11,316,304 | B2 | 4/2022 | Chen et al. | |
| 11,817,639 | B2 * | 11/2023 | Yi | H01R 12/57 |
| 2006/0040557 | A1 | 2/2006 | Yamaguchi | |
| 2007/0167078 | A1 | 7/2007 | Yamaji | |
| 2008/0014797 | A1 | 1/2008 | Yang | |
| 2016/0336667 | A1 | 11/2016 | Kee Mew | |
| 2019/0267760 | A1 | 8/2019 | Chen | |
| 2021/0075159 | A1 | 3/2021 | Wang | |
| 2021/0336361 | A1 | 10/2021 | Shen et al. | |
| 2021/0336386 | A1 | 10/2021 | Wu et al. | |

FOREIGN PATENT DOCUMENTS

| | | | |
|---|---|---|---|
| JP | 2015-56244 | A | 3/2015 |
| JP | 2019-117692 | A | 7/2019 |
| TW | M409578 | U1 | 8/2011 |
| TW | D189481 | S | 4/2018 |
| TW | M565894 | U | 8/2018 |
| TW | D192833 | S | 9/2018 |
| TW | D198414 | S | 7/2019 |

* cited by examiner

BOARD END CONNECTOR AND CONNECTOR ASSEMBLY

CROSS REFERENCE TO RELATED APPLICATION

This application is a divisional application of U.S. patent application Ser. No. 17/221,278, filed on Apr. 2, 2021, which claims the priority benefit of Chinese Patent Application Serial No. 202010334204.4, filed on Apr. 24, 2020, and Chinese Patent Application Serial No. 202011015371.9, filed on Sep. 24, 2020, the full disclosure of which is incorporated herein by reference.

BACKGROUND

Technical Field

The present disclosure relates to the technical field of connector, particularly to a board end connector and a connector assembly.

Related Art

The conventional board end connector comprises an insulating body, a terminal assembly and a housing. The terminal assembly is disposed in the insulating body, and the housing is disposed on an outer surface of the insulating body. A limiting component or a positioning component can be arranged between the housing and the insulating body, but cannot perfectly secure the housing onto the insulating body, which means that the retaining force between the housing and the insulating body is insufficient. Thus, the housing can be easily detached from the insulating body when the board end connector is in use.

SUMMARY

The embodiments of the present disclosure provide a board end connector and a connector assembly to solve the problem that the housing of conventional board end connector is easily detached from the insulating body.

The embodiments of the present disclosure provide a board end connector, comprising a board end insulating body, a terminal module, and a housing. The board end insulating body comprises a board end plugging surface and a plugging slot. The plugging slot is disposed on the board end plugging surface and comprises two interference sidewalls which are oppositely disposed. The terminal module is disposed in the board end insulating body. The housing is disposed on one side of the board end insulating body. A plugging bump member is provided on one side of the housing. The plugging bump member is disposed in the plugging slot. An interfering bump is provided on at least one side of the plugging bump member. The interfering bump interferes with at least one of the two interference sidewalls. Wherein one side of the interfering bump close to the board end plugging surface is provided with a limiting surface. The extending direction of the limiting surface intersects with the extending direction of the two interference sidewalls. One side of the interfering bump away from the board end plugging surface is further provided with a guiding inclined surface.

Another embodiment of the present disclosure provides a connector assembly, comprising a board end connector according to the above description, and a wire end connector which is connected to the board end connector.

In the embodiments of the present disclosure, by connecting the plugging bump member of the housing with the plugging slot of the board end insulating body while the interfering bump of the plugging bump member interferes with the interference sidewall of the plugging groove, the retaining force holding the housing and the board end insulating body can be increased. Thus, the housing can be firmly connected with the board end insulating body, and can be effectively prevented from detaching from the board end insulating body.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
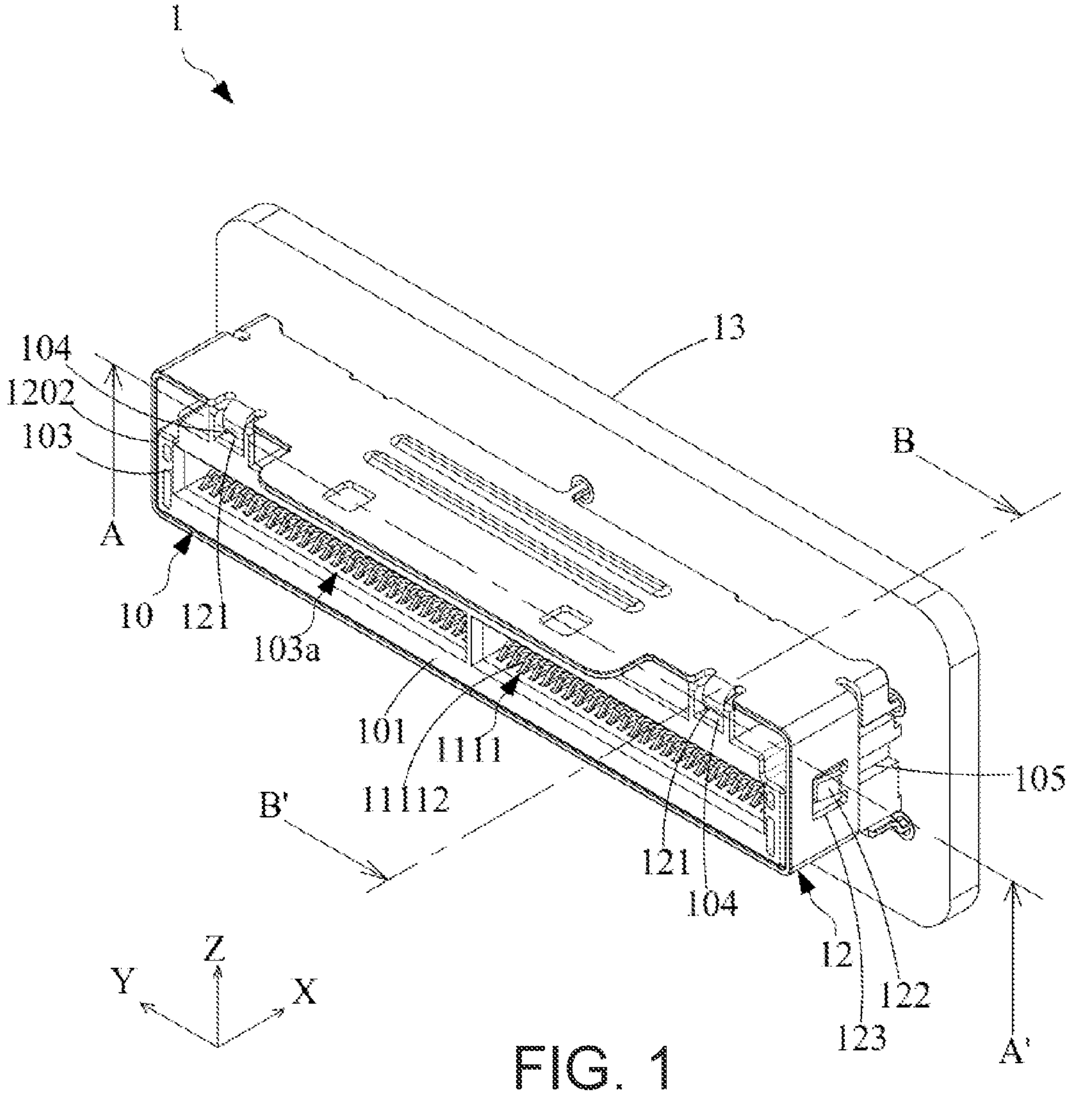
FIG. 1 is a perspective view of a board end connector of an embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the disclosure.

Figure 2:
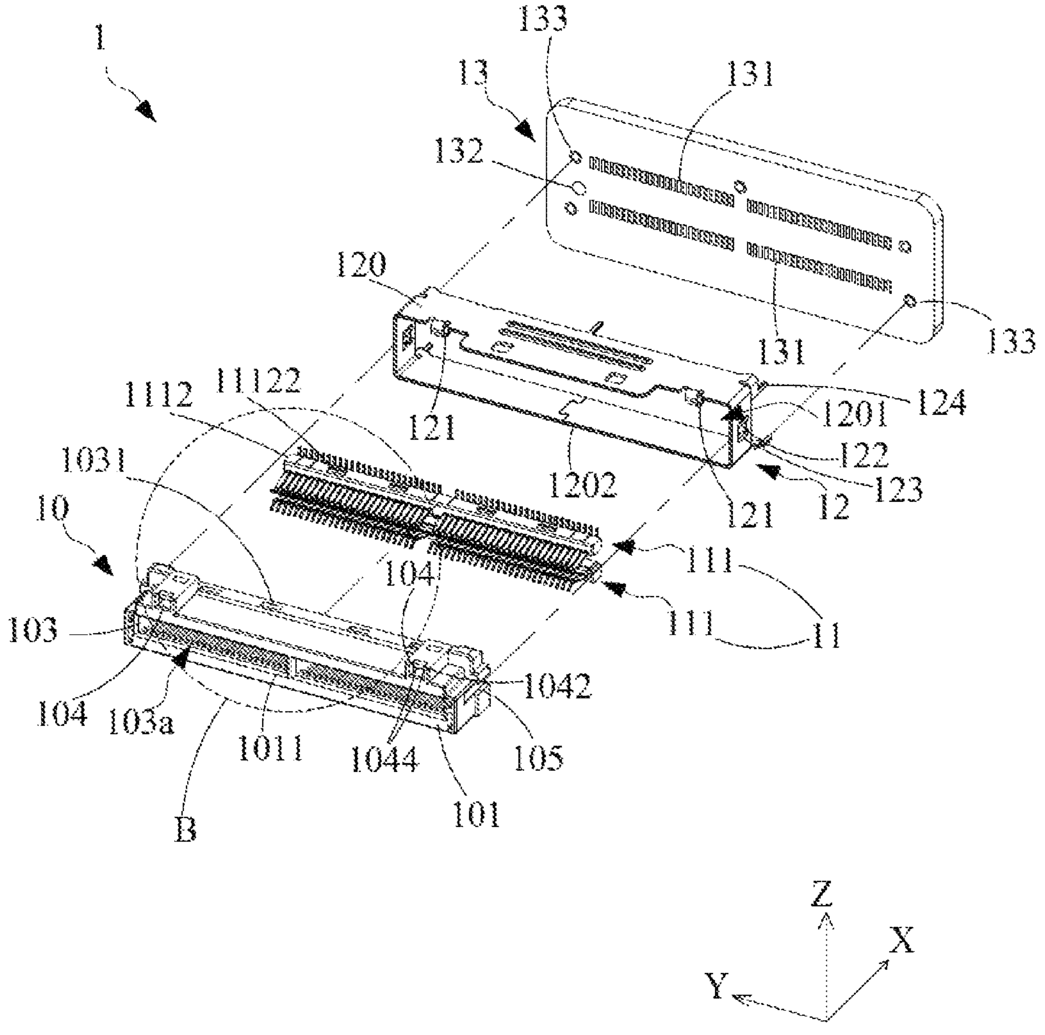
FIG. 2 is an exploded view of a board end connector of an embodiment of the present disclosure.
Figure 3:
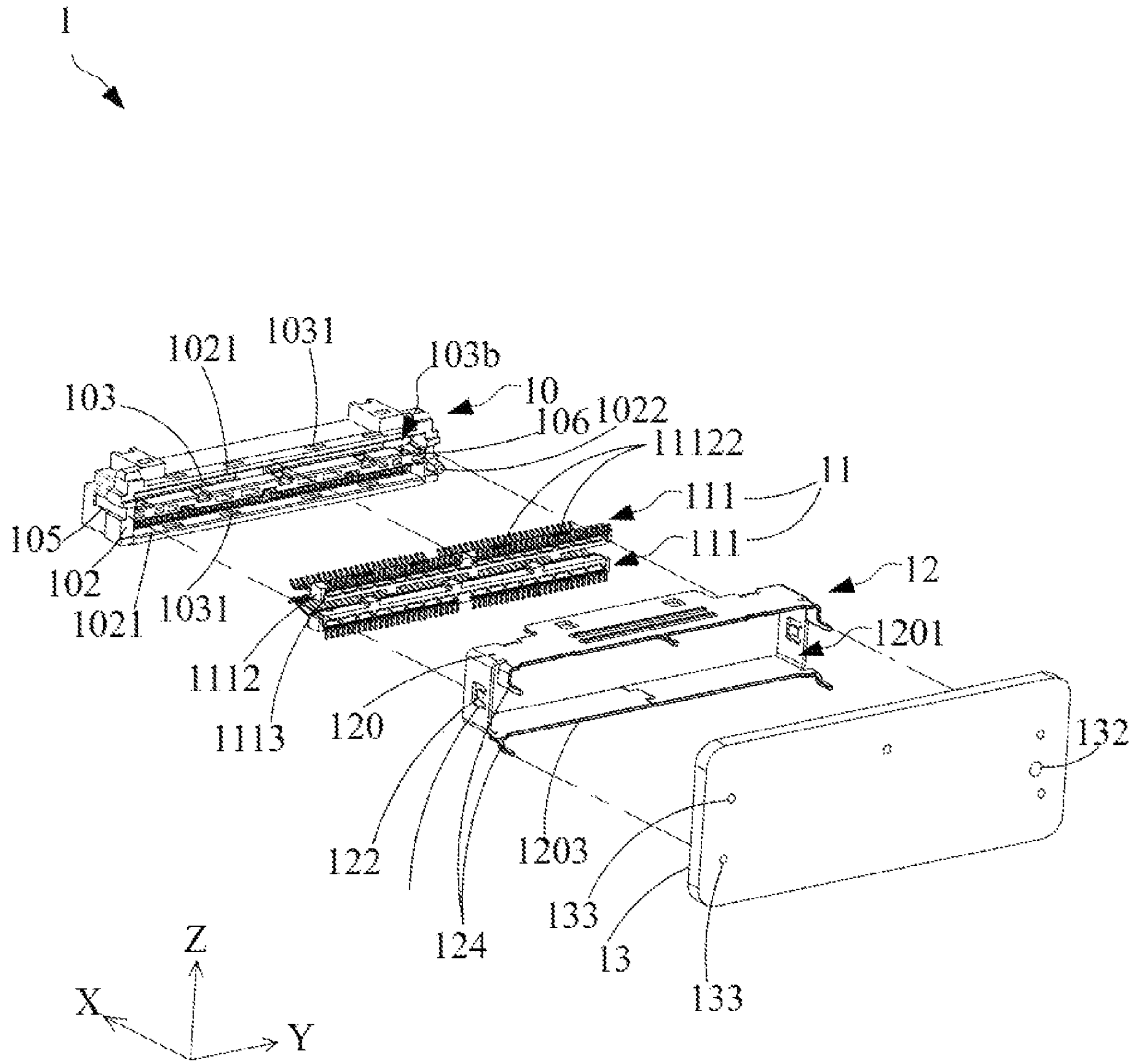
FIG. 3 is another exploded view of a board end connector of an embodiment of the present disclosure.
Figure 4:
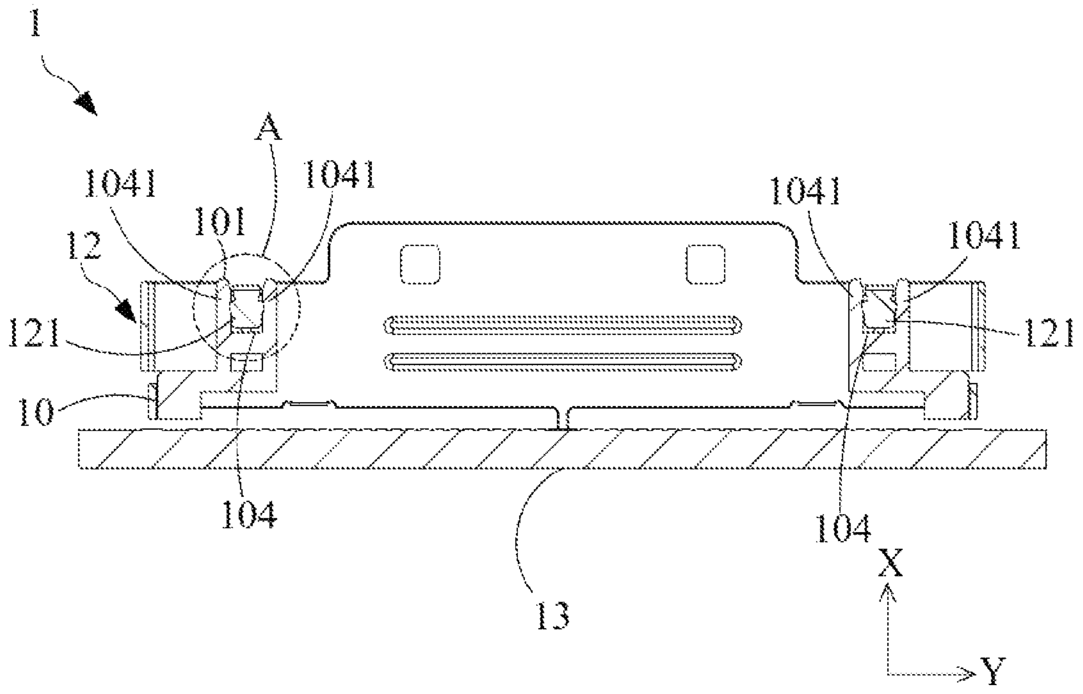
FIG. 4 is a cross-sectional view along line A-A' in FIG. 1.

FIG. 1 to FIG. 3 are perspective view, exploded views of a board end connector of an embodiment of the present disclosure, and FIG. 4 is a cross-sectional view along line A-A' in FIG. 1. As shown in the figures, the board end connector 1 of this embodiment comprises a board end insulating body 10, a terminal module 11, a housing 12, and a circuit board 13. The board end insulating body 10 comprises a board end plugging surface 101, a board end connecting surface 102, an accommodating groove 103, and a plugging slot 104. The board end plugging surface 101 is opposite to the board end connecting surface 102. The accommodating groove 103 penetrates the board end plugging surface 101 and the board end connecting surface 102 along a first direction X to form a plugging opening 1011 on the board end plugging surface 101 and a connecting opening 1021 on the board end connecting surface 102. The plugging slot 104 is disposed on the board end plugging surface 101 and extends closing to the board end connection surface 102 along the first direction X. The terminal module 11 is disposed in the accommodating groove 103 of the board end insulating body 10. The housing 12 is disposed on one side of the board end insulating body 10. One side of the housing 12 is provided with a plugging bump member 121, which is disposed in the plugging slot 104.

Figure 5:
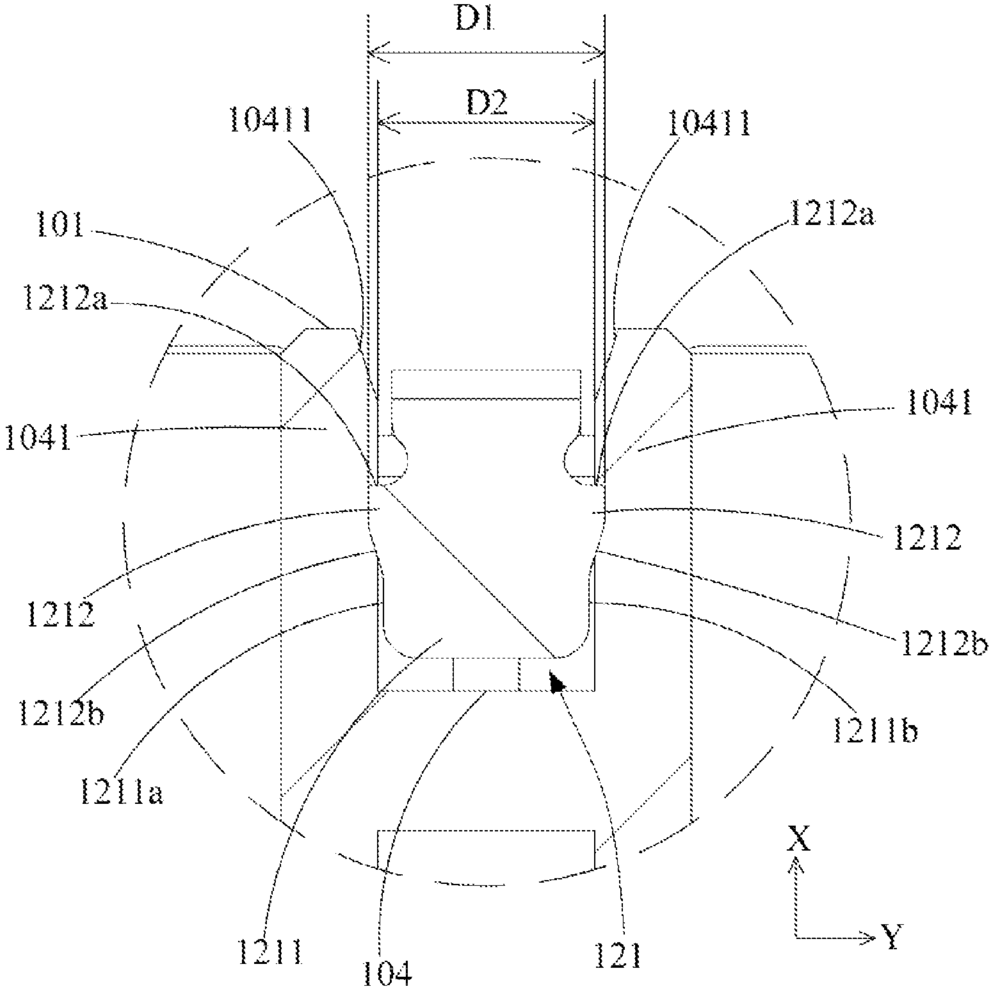
FIG. 5 is an enlarged view of area A in FIG.4.

FIG. 5 is an enlarged view of area A in FIG.4. As shown in the figure, the plugging slot 104 comprises two opposite interference sidewalls 1041, and at least one side of the plugging bump member 121 interferes with at least one interference sidewall 1041 of the plugging slot 104. In this embodiment, the two interference sidewalls 1041 are disposed in the second direction Y at intervals. At least one side of the plugging bump member 121 in the second direction Y interferes with at least one interference sidewall 1041 of the plugging slot 104 so that the housing 12 can be firmly connected to the board end insulating body 10, wherein the second direction Y is orthogonal to the first direction X. The circuit board 13 is disposed on one side of the board end insulating body 10 away from the board end plugging surface 101. That is, the circuit board 13 is disposed on one side of the board end connecting surface 102 of the board end insulating body 10, and is connected with the terminal module 11. The housing 12 of this embodiment is made of metal.

In this embodiment, the housing 12 further comprises a housing body 120, which comprises an accommodating space 1201, a first opening 1202, and a second opening 1203. The first opening 1202 is opposite to the second opening 1203 and is communicating with the accommodating space 1201. The plugging bump member 121 is disposed on the side of the first opening 1202 extends toward the second opening 1203 along the first direction X. The plugging bump member 121 is disposed in the accommodating space 1201 of the housing body 120. A gap exists between the plugging bump member 121 and a sidewall of the housing body 120.

When the housing 12 is disposed on one side of the board end insulating body 10, the board end insulating body 10 would be staying in the accommodating space 1201 of the housing 12, the board end plugging surface 101 of the board end insulating body 10 would be exposed from the first opening 1202, and the board end connecting surface 102 of the board end insulating body 10 would be exposed from the second opening 1203. The plugging bump member 121 is disposed in the plugging slot 104 and is disposed on one side of the housing 12 close to the board end plugging surface 101. The plugging bump member 121 extends along the first direction X closing to the board end connecting surface 102.

The plugging bump member 121 comprises a plugging board body 1211 and two interfering bumps 1212. The plugging board body 1211 extends along the first direction X closing to the board end connecting surface 102 and comprises a first side edge **1211*a* and a second side edge 1211*b* oppositely arranged. In this embodiment, the first side edge 1211*a* and the second side edge 1211*b* are disposed along a second direction Y at intervals. The two interfering bumps 1212 are respectively disposed on the first side edge 1211*a* and the second side edge 1211*b* of the plugging board body 1211. The two interfering bumps 1212 protrude from the plugging board body 1211 along the second direction Y, and interfere with the two opposed interference sidewalls 1041 of the plugging slot 104 to allow the housing 12 to be firmly connected with the board end insulating body 10. Since the distance between one side of each of the interfering bumps 1212 away from the plugging board body 1211 and one side of another interfering bump 1212 away from the plugging board body 1211 is slightly greater than the distance D2 between the two interference sidewalls 1041 of the plugging slot 104, the two interfering bumps 1212 could interfere with the two opposed interference sidewalls 1041 of the plugging slot 104**.

It is also possible to provide only one interfering bump 1212 on the first side edge **1211*a* of the plugging board body 1211, i.e., the distance between one side of the interfering bump 1212 away from the plugging board body 1211 and the second side edge 1211*b* is slightly greater than the distance D2 between the two interference sidewalls 1041 of the plugging slot 104. The interfering bump 1212 can interfere with the interference sidewall 1041 of the corresponding plugging slot 104. At this time, the second side edge 1211*b*** of the plugging board body 1211 abuts against the interference sidewall 1041 of the corresponding plugging slot 104, which also allows the housing 12 to be firmly connected to the board end insulating body 10.

In this embodiment, one side of each of the interfering bumps 1212 close to the board end plugging surface 101 comprises a limiting surface 1212*a*. The extending direction of the limiting surface 1212*a* intersects with the extending direction of the interference sidewall 1041 of the plugging slot 104. That is, the extending direction of the limiting surface 1212*a* is not parallel to the extending direction of the interference sidewall 1041 of the plugging slot 104. When the interfering bump 1212 interferes with the interference sidewall 1041 of the corresponding plugging slot 104, the limiting surface 1212*a* would intersect with the interference sidewall 1041 of the plugging slot 104 to prevent the plugging bump member 121 from detaching from the plugging slot 104. In this embodiment, the limiting surface 1212*a* extends along the second direction Y, and the interference sidewall 1041 of the plugging slot 104 extends along the first direction X. When the interfering bump 1212 interferes with the interference sidewall 1041 of the corresponding plugging slot 104, the limiting surface 1212*a* is orthogonal to the interference sidewall 1041 of the plugging slot 104.

In one embodiment, one side of each of the interfering bumps 1212 away from the board end plugging surface 101 is further provided with a guiding inclined surface 1212*b*. The distance between one end of the guiding inclined surface 1212*b* away from the board end connecting surface 102 and the first side edge 1211*a* (or the second side edge 1211*b*) of the plugging board body 1211 is smaller than the distance between one end of the guiding inclined surface 1212*b* close to the board end plugging surface 101 and the first side edge 1211*a* (or the second side edge 1211*b*) of the plugging board body 1211. The guiding inclined surface 1212*b* of each of the interfering bumps 1212 can move relative to the interference sidewall 1041 of the plugging slot 104 to guide the plugging bump member 121 into the plugging slot 104.

Figure 6:
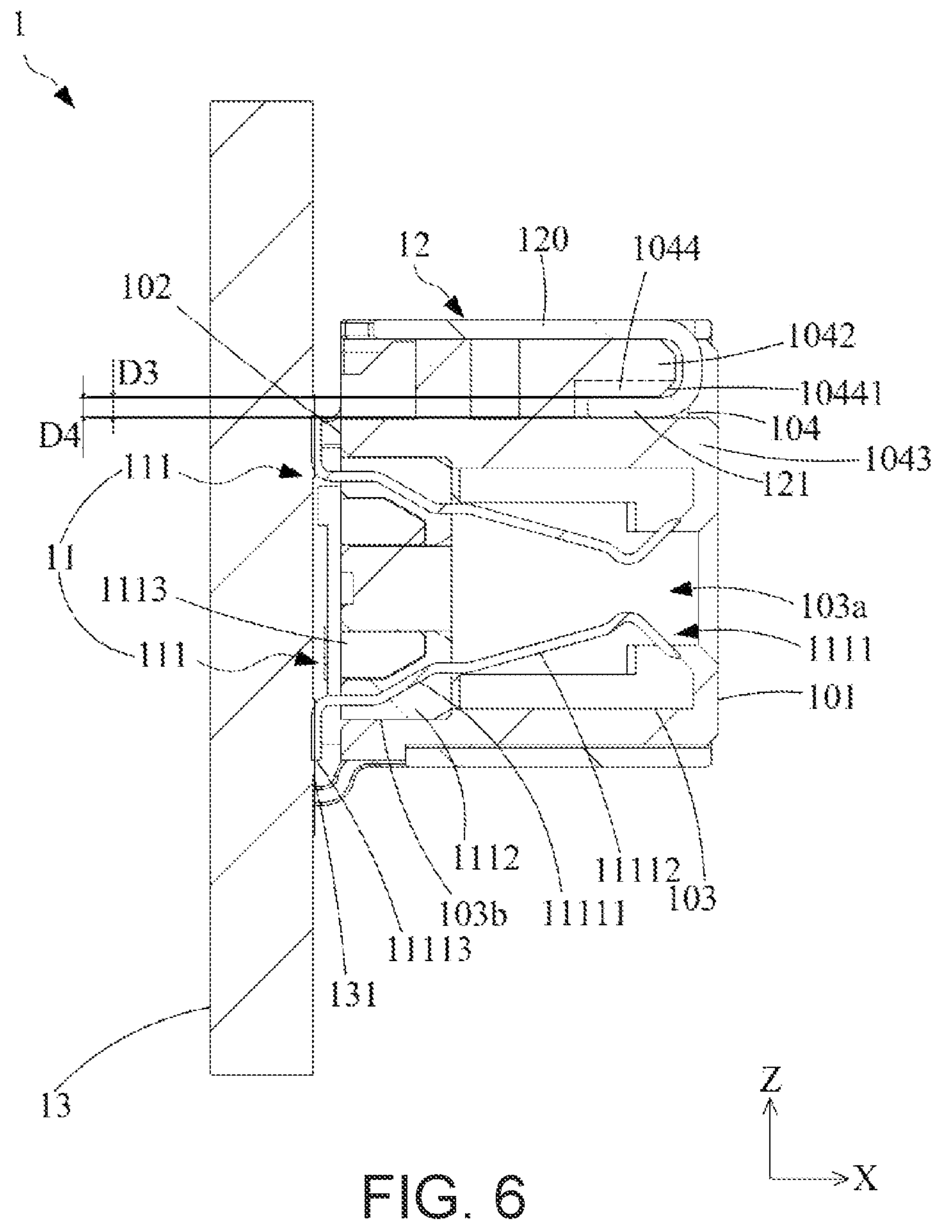
FIG. 6 is a cross-sectional view along line B-B' in FIG. 1.

FIG. 6 is a cross-sectional view along line B-B' in FIG. 1. In one embodiment, as shown in the figure, the plugging slot 104 further comprises a first plugging sidewall 1042 and a second plugging sidewall 1043 opposite to the first plugging sidewall 1042. The directions of the arrangement of the first plugging sidewall 1042 and the second plugging sidewall 1043 are orthogonal to those of the two interference sidewalls 1041. The first plugging sidewall 1042 and the second plugging sidewall 1043 of this embodiment are disposed along the first direction X at intervals. The first plugging side wall 1042 is also provided with a limiting block 1044, which protrudes toward a direction closing to the second plugging sidewall 1043. The distance D3 between a surface of the limiting block 1044 away from the first plugging sidewall 1042 and the second plugging sidewall 1043 is slightly greater than or equal to the thickness D4 of the plugging bump member 121, allowing the width of the plugging slot 104 in a direction orthogonal to the first plugging sidewall 1042 to be reduced. Thus, the position of the plugging bump member 121 in the plugging slot 104 can be limited to reduce the displacement of the plugging bump member 121 in the direction orthogonal to the first plugging sidewall 1042.

In this embodiment, the width of the plugging slot 104 in a third direction Z can be reduced through the limiting block 1044. In this way, the position of the plugging bump member 121 in the plugging slot 104 can be limited to reduce the displacement of the plugging bump member 121 in the third direction Z. In one embodiment, one side of the limiting block 1044 close to the board end plugging surface 101 is further provided with a first guiding surface 10441. The distance between one side of the first guiding surface 10441 close to the board end plugging surface 101 and the second plugging sidewall 1043 is greater than the distance between one side of the first guiding surface 10441 away from the board end plugging surface 101 and the second plugging sidewall 1043. In this embodiment, since the width of one side of the plugging slot 104 close to the board end plugging surface 101 in the third direction Z is greater than the width of one side of the plugging slot 104 close to the board end connecting surface 102 in the third direction Z, the plugging bump member 121 can be easily inserted into the plugging slot 104 through the board end plugging surface 101, and the first guiding surface 10441 could guide the plugging bump member 121 to be inserted into the plugging slot 104. In this embodiment, the number of limiting blocks 1044 is two, which are disposed on the first plugging sidewall 1042 along the second direction Y at intervals (see FIG. 2).

In one embodiment, one side of each of the interference sidewalls 1041 of the plugging slot 104 close to the board end plugging surface 101 is further provided with a second guiding surface 10411 (see FIG. 5). Thus, the width of one side of each of the interference sidewalls 1041 close to the board end plugging surface 101 in the second direction Y would be smaller than the width of one side of each of the interference sidewalls 1041 away from the board end plugging surface 101 in the second direction Y. In other words, the width of one side of the plugging slot 104 close to the board end plugging surface 101 in the second direction Y is greater than the width of one side of the plugging slot 104 away from the board end plugging surface 101 in the second direction Y. So, the plugging bump member 121 can be easily inserted into the plugging slot 104 through the board end plugging surface 101, and the two second guiding surfaces 10411 can guide the plugging bump member 121 to be inserted into the plugging slot 104. In other embodiments, it is possible to only provide one second guiding surface 10411, i.e., one of the two interference sidewalls 1041 would comprise a second guiding surface 10411 for the same effect described above.

Back to FIG. 2, since the number of the plugging bump members 121 in this embodiment is two, which matches the number of plugging slots 104, the number of plugging slots 104 is also two, but it is not limited thereto. In this embodiment, the plugging slot 104 is disposed at one side of a side edge of the board end plugging surface 101 in the third direction Z, and the plugging bump members 121 is disposed at a side edge of the housing 12 in the third direction Z. The plugging slot 104 could also be disposed on one side of the side edge of the board end plugging surface 101 in the second direction Y. The plugging bump members 121 is disposed corresponding to the plugging slot 104 and can be disposed on a side edge of the housing 12 in the second direction Y. When the plugging slot 104 is also provided on one side of the side edge of the board end plugging surface 101 in the second direction Y, the two interference sidewalls 1041 of the plugging slot 104 are disposed in the third direction Z at intervals. The first plugging sidewall 1042 and the second plugging sidewall 1043 of the plugging slot 104 are disposed in the second direction Y at intervals.

Back to FIG. 1 to FIG. 3, in this embodiment, two opposite sides of the board end insulating body 10 in the second direction Y are respectively provided with an engaging groove 105 extending along the first direction X. One end of the engaging groove 105 penetrates the board end connecting surface 102. Two opposite sides of the housing 12 in the second direction Y are respectively provided with an engaging elastic piece 122 extending into the housing 12. When the housing 12 is disposed on one side of the board end insulating body 10, onto which the housing 12 would first sleeve through the board end connecting surface 102 of the board end insulating body 10, then moves to the board end plugging surface 101 of the board end insulating body 10. Meanwhile, each of the engaging elastic pieces 122 is disposed in the corresponding engaging groove 105. When the housing 12 is disposed behind one side of the board end insulating body 10, one end of the engaging elastic pieces 122 in the housing 12 abuts against a sidewall of the engaging groove 105 in the first direction X. In this way, the board end insulating body 10 can be prevented from being displaced toward the circuit board 13 in the first direction X relative to the housing 12. In one embodiment, two opposite sides of the housing 12 in the second direction Y are respectively provided with an opening 123. The two engaging elastic pieces 122 correspond to the two openings 123, respectively. When the housing 12 is disposed on one side of the board end insulating body 10, each of the engaging elastic pieces 122 is squeezed by the board end insulating body 10 and moves toward corresponding the opening 123. That is, the opening 123 provides a free space for the engaging elastic piece 122 to keep the engaging elastic piece 122 from affecting the assembly of the board end insulating body 10 with the housing 12.

Figure 7:
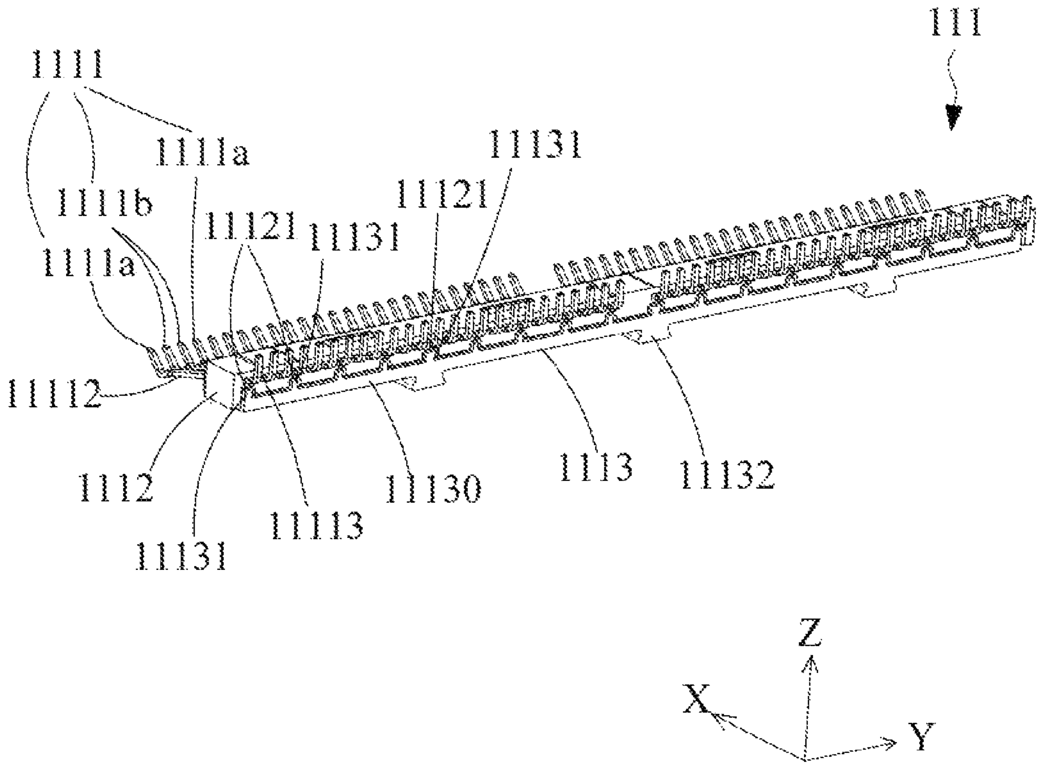
FIG. 7 is a perspective view of a terminal component of an embodiment of the present disclosure.

In this embodiment, the terminal module 11 comprises two terminal components 111 oppositely disposed. The two terminal components 111 are disposed in the accommodating groove 103 of the board end insulating body 10 along the third direction Z. FIG. 7 is a perspective view of a terminal component of an embodiment of the present disclosure. As shown in the figure, each of the terminal components 111 comprises a plurality of terminals 1111, a terminal insulating body 1112, and a conductive colloid 1113. The plurality of terminals 1111 are disposed at intervals. Each of the terminals 1111 comprises a terminal body 11111, a plugging end part 11112, and a connecting end part 11113. The plugging end part 11112 and the connecting end part 11113 are respectively disposed at two ends of the terminal body 11111. The terminal insulating body 1112 covers the plurality of terminal bodies 1111 of the plurality of terminals 1111. The plurality of plugging end parts 11112 and the plurality of connecting end parts 11113 are exposed from the terminal insulating body 1112, i.e., two ends of each of the terminals 1111 are exposed from the terminal insulating body 1112. The conductive colloid 1113 is disposed on one side of the terminal insulating body 1112.

In one embodiment, the plurality of terminals 1111 comprises a plurality of ground terminals 1111*a* and a plurality of signal terminals 1111*b*. Two signal terminals 1111*b* are provided between two adjacent ground terminals 1111*a*. A surface of the terminal insulating body 1112 close to the conductive colloid 1113 is provided with a plurality of recesses 11121 at intervals. The plurality of recesses 11121 respectively correspond to the plurality of ground terminals 1111*a*. A plurality of bumps 11131 are disposed on a surface of the conductive colloid 1113 close to the terminal insulating body 1112 at intervals. The plurality of bumps 11131 are respectively disposed in the corresponding recesses 11121, so that the plurality of bumps 11131 would correspond to the plurality of ground terminals 1111*a*, respectively. The conductive colloid 1113 further comprises a colloid body 11130. The plurality of bumps 11131 are disposed on a surface of the colloid body 11130 close to the terminal insulating body 1112 at intervals. The distance between an end surface of each of the bumps 11131 close to the terminal insulating body 1112 and the corresponding ground terminal 1111*a* is smaller than the distance between a surface of the colloid body 11130 close to the terminal insulating body 1112 and the plurality of signal terminals 1111*b*. In other words, the conductive colloid 1113 could shorten the distance between the conductive colloid 1113 and the corresponding ground terminal 1111*a* through the plurality of bumps 11131, allowing the distance between the conductive colloid 1113 and the corresponding ground terminal 1111*a* to be smaller than the distance between the conductive colloid 1113 and the signal terminal 1111*b*. So, the conductive colloid 1113 and the plurality of ground terminals 1111*a* would form a plurality of shielding areas, allowing two signal terminals 1111*b* in each of the shielding areas would not crosstalk with other two signal terminals 1111*b* in the adjacent shielding area. In this way, electromagnetic shielding and electric conductivity can be achieved.

In one embodiment, a surface of the conductive colloid 1113 close to the plurality of terminals 1111 is parallel to the terminal body 11111 of each of the terminals 1111. So, the SI performance of the board end connector 1 can be improved. When the terminal body 11111 of each of the terminals 1111 is bent, the surface of each of the bumps 11131 of the conductive colloid 1113 close to the plurality of terminals 1111 is also bent. The shape of the surface of the conductive colloid 1113 close to the plurality of terminals 1111 matches the shape of the terminal body 11111 of each of the terminals 1111, so the surface of the conductive colloid 1113 close to the plurality of terminals 1111 is parallel to the terminal body 11111 of each terminal 1111. In one embodiment, at least one of the plurality of recesses 11121 is a dovetail recess, and at least one of the plurality of bumps 11131 is a dovetail bump, thereby the stability of the connection between the conductive colloid 1113 and the terminal insulating body 1112 can be increased.

Figure 8:
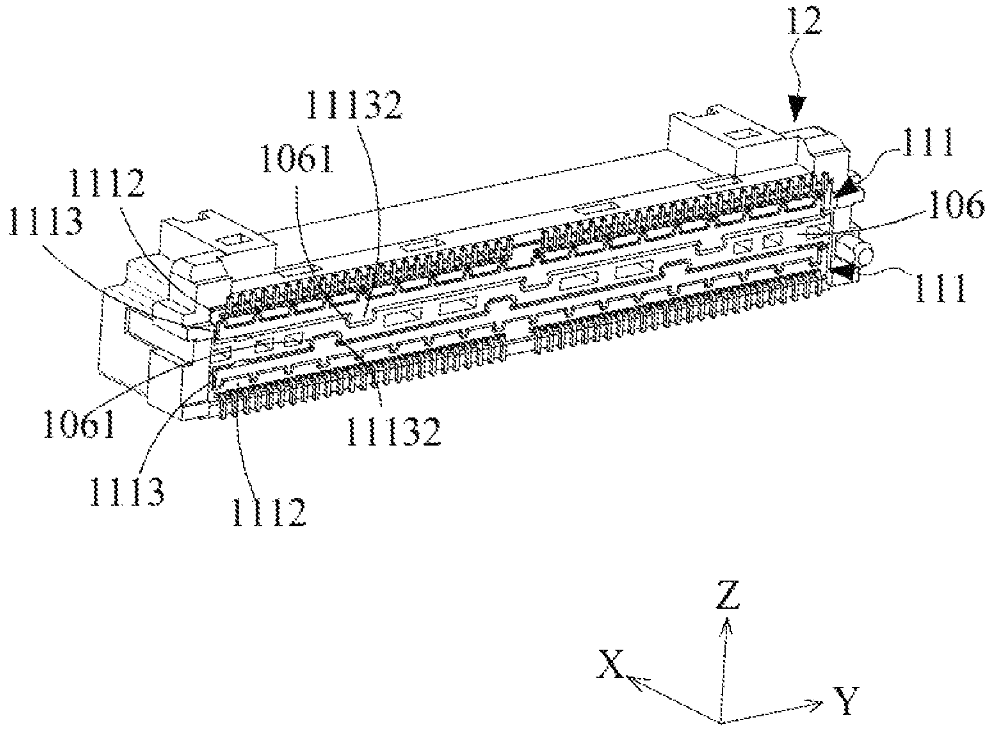
FIG. 8 is a perspective view of an assembly of a terminal module and a board end insulating body of an embodiment of the present disclosure.

Back to FIG. 6, the accommodating groove 103 of the board end insulating body 10 of this embodiment comprises an plugging part 103*a* and an accommodating part 103*b*, wherein the accommodating part 103*b* is farther than the plugging part 103*a* from the board end plugging surface 101. FIG. 8 is a perspective view of assembly of a terminal module and a board end insulating body of an embodiment of the present disclosure. As shown in the figure, the board end insulating body 10 of this embodiment further comprises a positioning member 106, two end s of which are respectively connected to two opposite sidewalls of the accommodating groove 103 in the second direction Y. The positioning member 106 is disposed in the accommodating part 103*b* and divides the accommodating part 103*b* into two accommodating spaces (see FIG. 2). When the two terminal components 111 are disposed in the board end insulating body 10, each of the terminal components 111 would be inserted into the accommodating groove 103 through the connecting opening 1021. The two terminal components 111 are respectively disposed in the corresponding accommodating space. The plugging end part 11112 of each of the terminals 1111 of each of the terminal components 111 is disposed in the plugging part 103*a*. The terminal body 11111, the terminal insulating body 1112, and the conductive colloid 1113 of each of the terminals 1111 of each of the terminal components 111 are disposed in the accommodating part 103*b*. The conductive colloid 1113 of each of the terminal components 111 is connected to the positioning member 106. The positioning member 106 positions the location of each of the terminal components 111 in the accommodating groove 103 of the board end insulating body 10.

Back to FIG. 7 and FIG. 8, in one embodiment, a surface of the positioning member 106 close to each of the terminal components 111 is provided with a first positioning part 1061. A surface of the conductive colloid 1113 of each of the terminal components 111 close to the positioning member 106 is provided with a second positioning part 11132. When each of the terminal components 111 is disposed in the accommodating groove 103, the second positioning part 11132 would be disposed in the corresponding first positioning part 1061. In this embodiment, the first positioning part 1061 is a recess, and the second positioning part 11132 is a bump, and the shape of the cross-sectional area of the first positioning part 1061 matches the shape of the cross-sectional area of the second positioning part 11132. In this embodiment, the cross-sectional area of the first positioning part 1061 and the cross-sectional area of the second positioning part 11132 are both dovetail-shaped. The width of one end of the second positioning part 11132 close to the terminal insulating body 1112 is smaller than the width of one end of the second positioning part 11132 away from the terminal insulating body 1112, which means the width of one end of the first positioning part 1061 close to the terminal insulating body 1112 is smaller than the width of one end of the first positioning part 1061 away from the terminal insulating body 1112. The first positioning part 1061 and the second positioning part 11132 are slidingly connected in the first direction X, and the second positioning part 11132 cannot be detached from the first positioning part 1061 in the third direction Z. In this embodiment, the number of the first positioning parts 1061 and the number of the second positioning parts 11132 are multiple, and the number of first positioning parts 1061 is identical to the number of second positioning parts 11132. The first positioning part 1061 could also be a bump, and the second positioning part 11132 could also be a recess.

Figure 9:
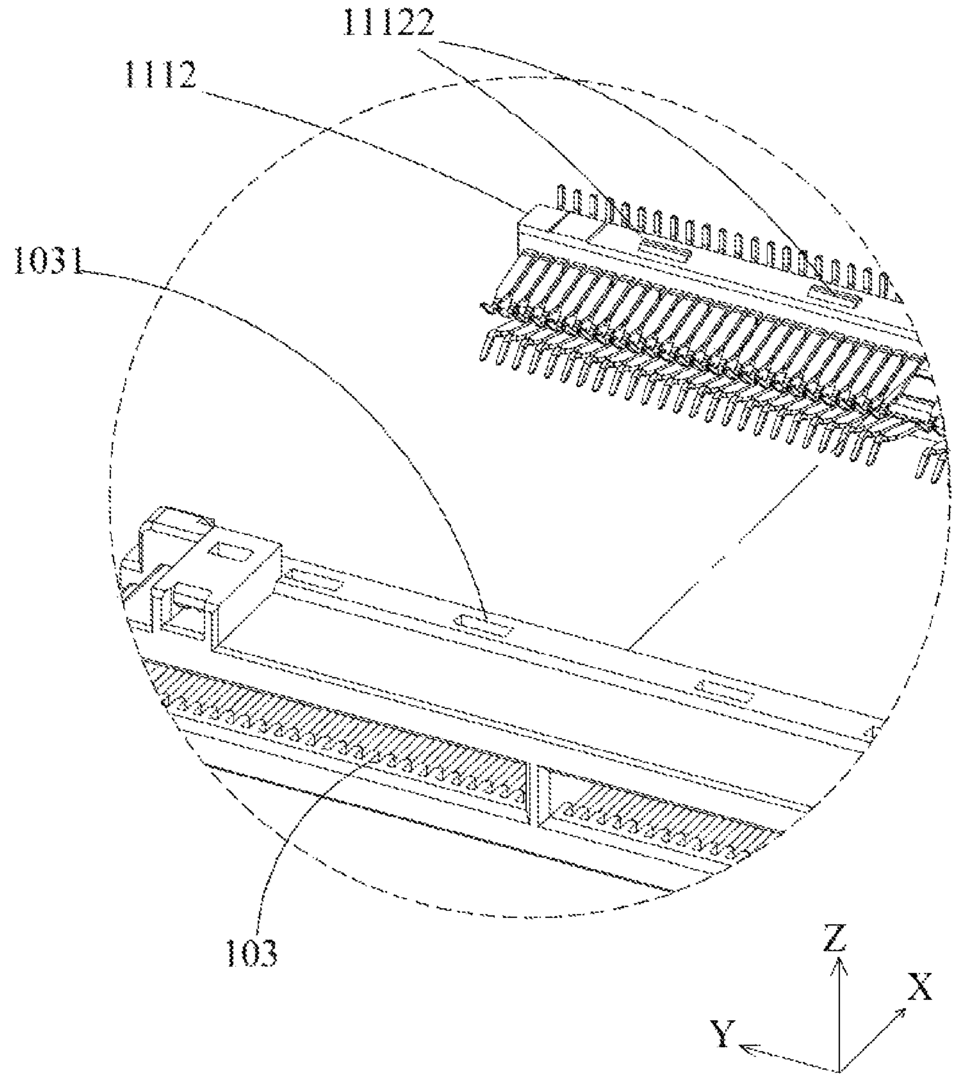
FIG. 9 is an enlarged view of area B in FIG. 2.

Back to FIG. 2 and FIG. 3 with FIG. 9, an enlarged view of area B in FIG. 2, in this embodiment, a sidewall of the accommodating groove 103 close to each of the terminal components 111 is further provided with a first connecting part 1031, and a surface of the terminal insulating body 1112 of each of the terminal components 111 away from the conductive colloid 1113 in the third direction Z is further provided with a second connecting part 11122. When each of the terminal components 111 is disposed in the accommodating groove 103, the second connecting part 11122 of the terminal insulating body 1112 of each of the terminal components 111 is connected to the first connecting part 1031 through buckling to secure each of the terminal components 111 in the accommodating groove 103, preventing each of the terminal components 111 from being detached from the board end connecting surface 102 along the first direction X. In this embodiment, the first connecting part 1031 is a hole, and the second connecting part 11122 is a bump member. In this embodiment, the number of first connecting parts 1031 and the number of second connecting parts 11122 are multiple, which are also provided in the same numbers.

Back to FIG. 2, FIG. 3 and FIG. 6, in this embodiment, the circuit board 13 comprises a plurality of conductive pads 131 disposed at intervals. The connecting end part 11113 of each of the terminals 1111 of each of the terminal components 111 is connected to the corresponding conductive pad 131. A connecting post 1022 is also provided on a surface of the board end insulating body 10 away from the board end plugging surface 101 (the board end connecting surface 102). The circuit board 13 comprises a connecting hole 132. When the circuit board 13 is disposed at the housing 12, the connecting post 1022 would be disposed in the connecting hole 132, allowing the connecting end part 11113 of each of the terminals 1111 to be accurately connected to the corresponding conductive pad 131. In this embodiment, one side of the housing 12 away from the board end plugging surface 101 further comprises a plurality of plugging columns 124 disposed on the periphery of the second opening 1203. The circuit board 13 comprises a plurality of insertion holes 133, into which the plurality of plugging columns 124 are respectively inserted to connect the housing 12 with the circuit board 13. Thus, the position of the board end insulating body 10 relative to the circuit board 13 can be fixed, so that the terminal module 11 can be stably connected with the circuit board 13.

Figure 10:
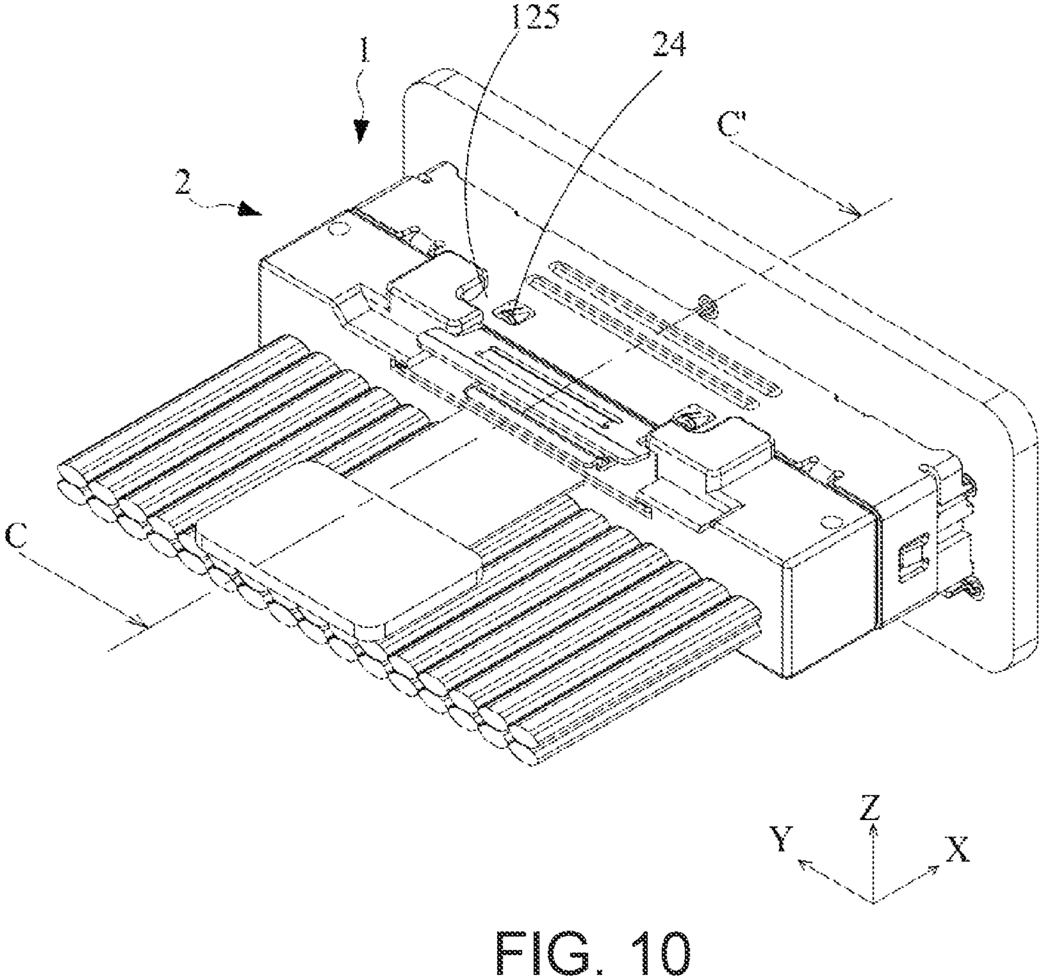
FIG. 10 is a perspective view of a board end connector assembled on a wire end connector of an embodiment of the present disclosure.
Figure 11:
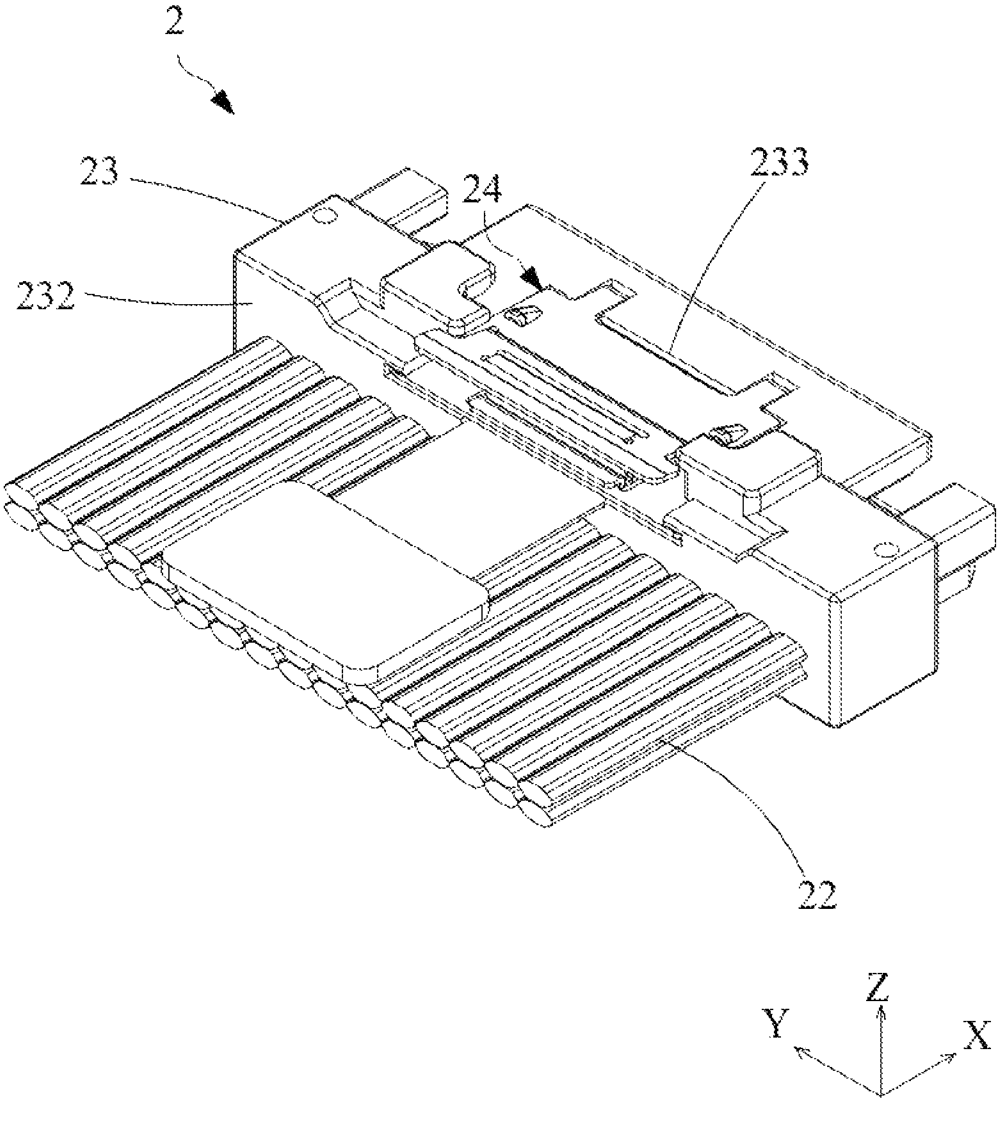
FIG. 11 is a perspective view of a wire end connector of an embodiment of the present disclosure.
Figure 12:
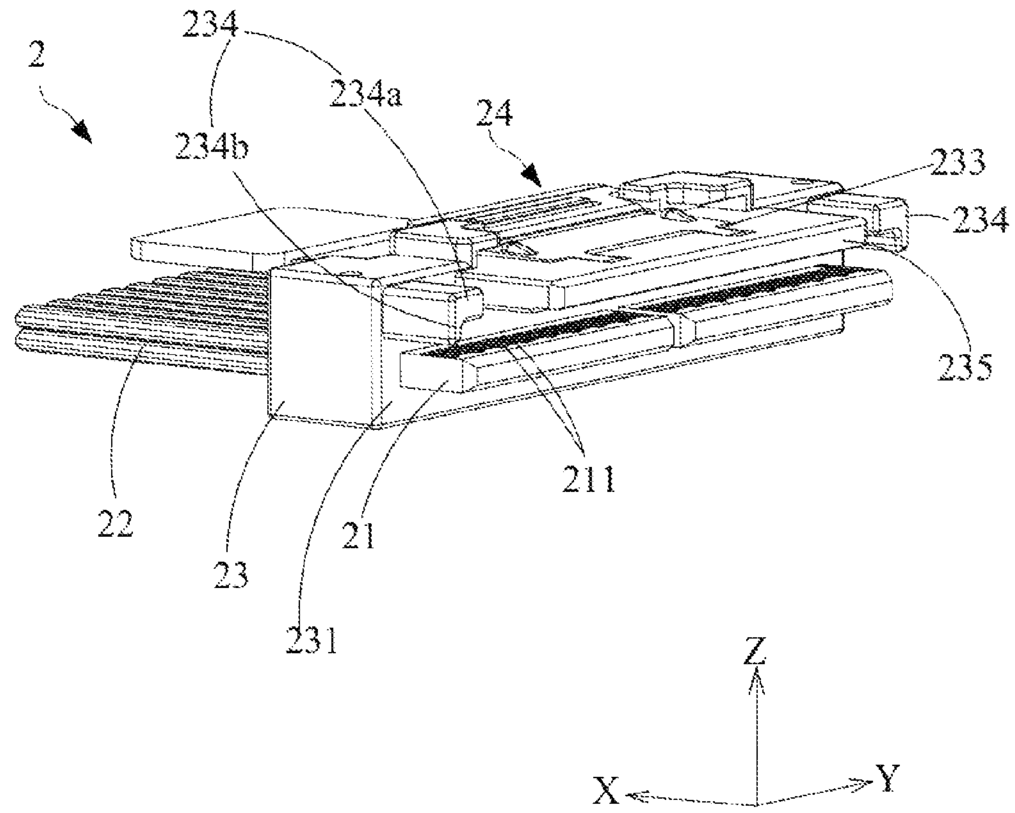
FIG. 12 is another perspective view of a wire end connector of an embodiment of the present disclosure.
Figure 13:
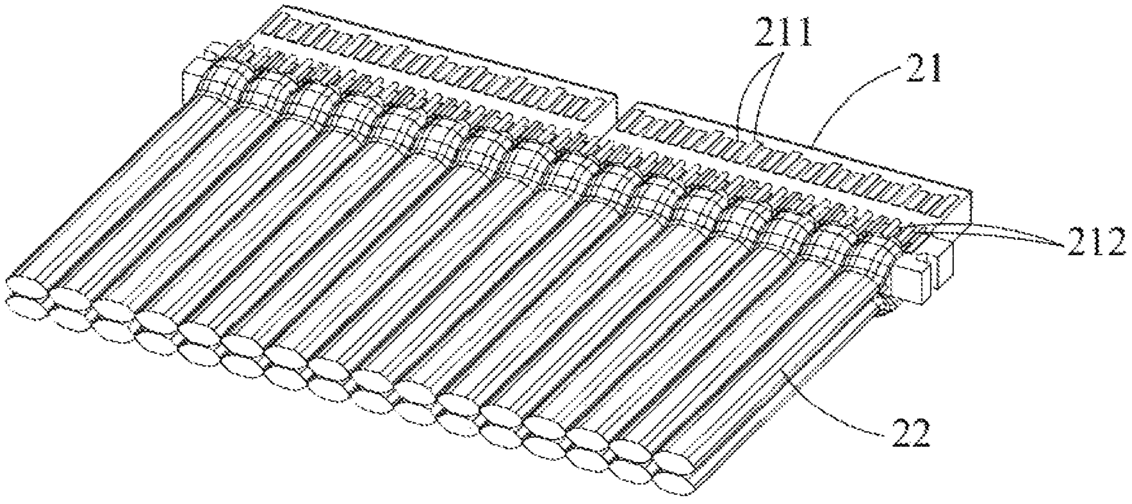
FIG. 13 is a perspective view of an assembly of a wire end plugging bump member and a cable of an embodiment of the present disclosure.

FIG. 10 is a perspective view of a board end connector assembled on a wire end connector of an embodiment of the present disclosure. As shown in the figure, the board end connector 1 of this embodiment is connected to a wire end connector 2 to form a connector assembly. FIG. 11 and FIG. 12 are perspective views of a wire end connector of an embodiment of the present disclosure. FIG. 13 is a perspective view of assembly of a wire end plugging bump member and a cable of an embodiment of the present disclosure. As shown in the figures, the wire end connector 2 of this embodiment comprises a wire end plugging bump member 21, a cable 22, and a wire end insulating body 23. The wire end plugging bump member 21 comprises a plurality of terminal contacting pads 211 and a plurality of cable connecting pads 212. The plurality of terminal contacting pads 211 are disposed on two opposite surfaces of the wire end plugging bump member 21 at intervals and are disposed on one side of the wire end plugging bump member 21. The plurality of cable connecting pads 212 are disposed on two opposite surfaces of the wire end plugging bump member 21 at intervals, and are disposed on the other side of the wire end plugging bump member 21. The plurality of cable connecting pads 212 are electrically connected with the plurality of terminal contacting pads 211, respectively. One end of the cable 22 is soldered onto the plurality of cable connecting pads 212 to be electrically connected to the plurality of terminal contacting pads 211, and the other end of the cable 22 extends in a direction away from the wire end plugging bump member 21.

The wire end insulating body 23 is disposed at a part of the wire end plugging bump member 21 and a part of the cable 22. The wire end insulating body 23 comprises a wire end plugging surface 231 and a wire end connecting surface 232. One side of the wire end plugging bump member 21 having the plurality of terminal contacting pads 211 protrudes from the wire end plugging surface 231, so the plurality of terminal contacting pads 211 are exposed. The other end of the cable 22 protrudes from the wire end connecting surface 232.

Figure 14:
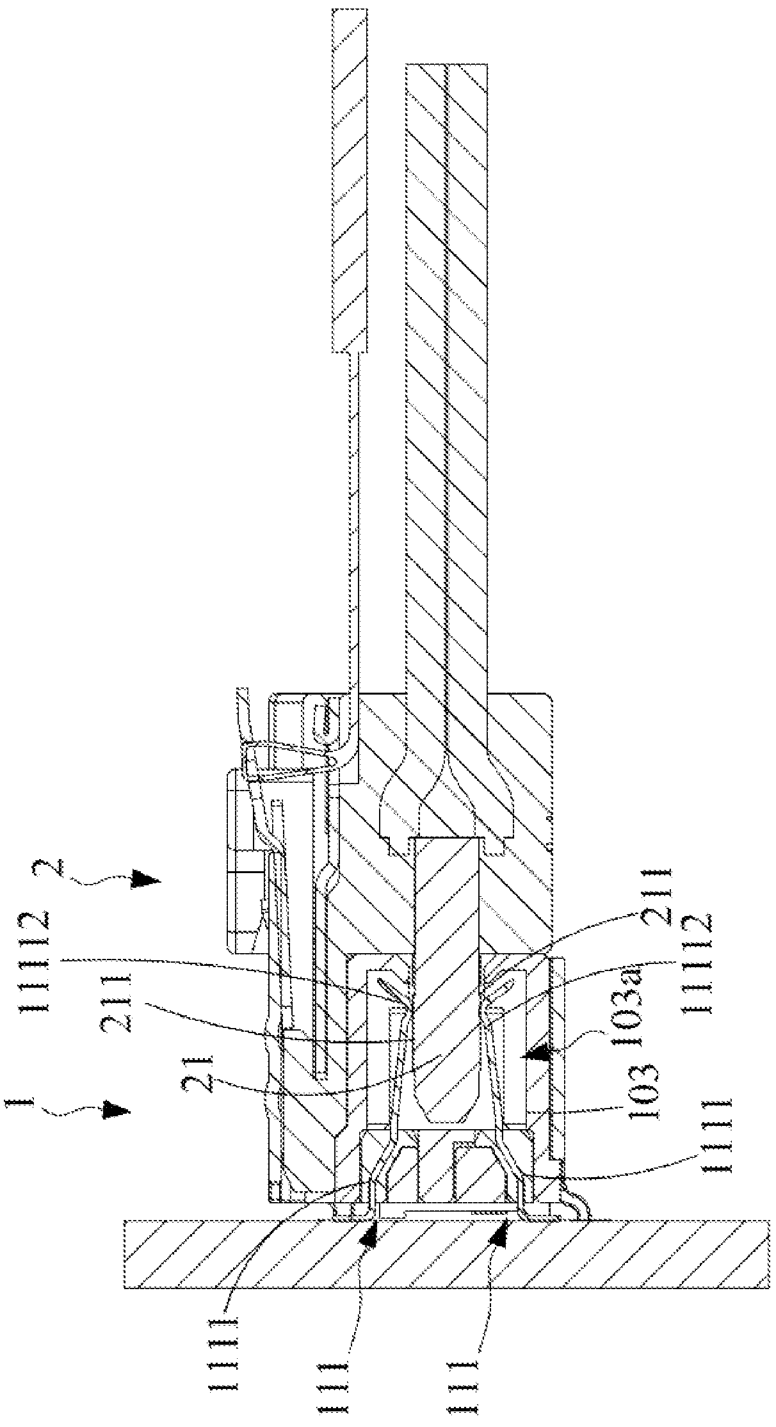
FIG. 14 is a cross-sectional view along line C-C' in FIG. 10.

FIG. 14 is a cross-sectional view along line C-C' in FIG. 10. As shown in the figure, in this embodiment, when the board end connector 1 is connected to the wire end connector 2, the wire end plugging bump member 21 of the wire end connector 2 would be inserted into the plugging part 103*a* of the accommodating groove 103 of the board end connector 1. So, the wire end plugging bump member 21 is disposed between the two terminal components 111, and the plugging end part 11112 of each of the terminals 1111 of each of the terminal components 111 would be in contact with the corresponding terminal contacting pad 211 to allow the board end connector 1 and the wire end connector 2 to be electrically connected for signal transmission.

Figure 15:
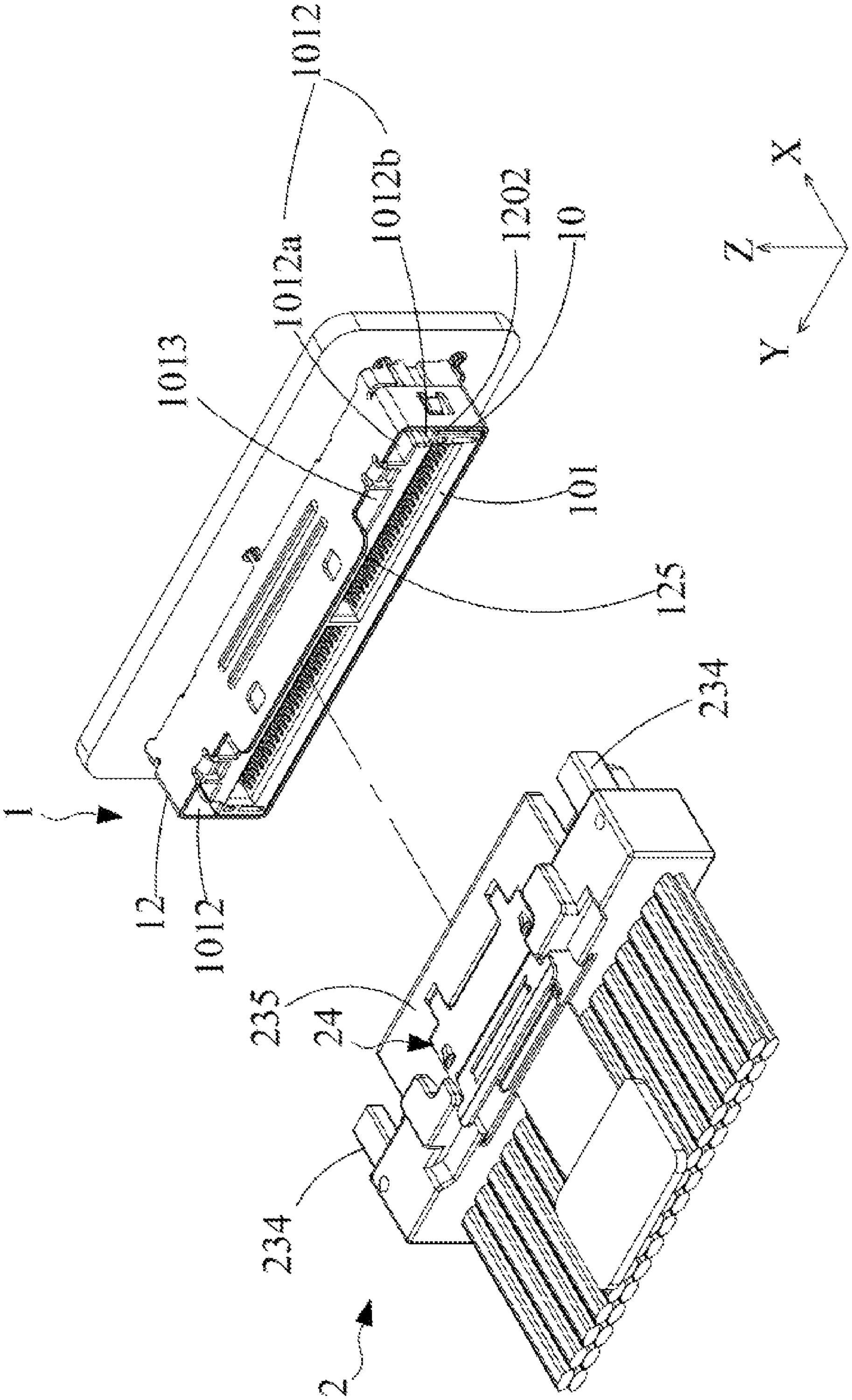
FIG. 15 is an exploded view of a connector assembly of an embodiment of the present disclosure.

Back to FIG. 11 and FIG. 12, the wire end connector 2 of this embodiment also comprises a latch component 24. A surface of the wire end insulating body 23 in the third direction Z is provided with a latch accommodating groove 233, in which the latch component 24 is disposed. FIG. 15 is an exploded view of a connector assembly of an embodiment of the present disclosure. As shown in the figure, in this embodiment, one side of the housing 12 of the board end connector 1 close to the board end plugging surface 101 further comprises a buckling part 125, which protrudes from the board end plugging surface 101 along the first direction X. When the board end connector 1 is connected to the wire end connector 2, the buckling part 125 would be connected to the latch component 24 (see FIG. 10) to increase the connection stability between the board end connector 1 and the wire end connector 2.

In one embodiment, the board end plugging surface 101 of the board end insulating body 10 further comprises two positioning slots 1012 oppositely disposed. The wire end plugging surface 231 of the wire end insulating body 23 of the wire end connector 2 also comprises two positioning bump members 234 oppositely disposed (see FIG. 12). When the board end connector 1 is connected to the line end connector 2, each of the positioning bump members 234 would be disposed in the corresponding positioning slot 1012 to guide the board end connector 1 to be connected with the wire end connector 2 in a precise insertion. Besides, the orthographic projection of the two positioning bump members 234 projected on the wire end plugging surface 231 is within the surface range of the wire end plugging surface 231, and the orthographic projection of the two positioning slots 1012 projected on the board end plugging surface 101 is in the first opening 1202. When the board end connector 1 is connected to the wire end connector 2, the area where the board end connector 1 and the wire end connector 2 are connected would be maintained within the area of the first opening 1202 of the housing 12 of the board end connector 1 and the area of the wire end plugging surface 231 of the wire end insulating body 23. Thus, the size of the board end connector 1 and wire end connector 2 would not be increased.

The shape of each of the positioning slots 1012 matches the shape of each of the positioning bump members 234. In this embodiment, each of the positioning slots 1012 is inverted-L-shaped. The two positioning slots 1012 are symmetrically disposed with respect to the centerline of the board end plugging surface 101. The shape of each of the positioning bump members 234 matches the shape of the corresponding positioning slot 1012, so the shape of each of the positioning bump members 234 is also inverted-L-shaped. The two positioning bump members 234 are symmetrically disposed with respect to the centerline of the wire end plugging surface 231. Specifically, each of the positioning slots 1012 comprises a first slot part 1012*a* and a second slot part 1012*b* communicating with the first slot part 1012*a*, wherein the first slot part 1012*a* extends in the second direction Y, and the second slot part 1012*b* extends in the third direction Z. Each of the positioning bump members 234 comprises a first positioning bump part 234*a* and a second positioning bump part 234*b* connected with the first positioning bump part 234*a*, wherein the first positioning bump part 234*a* extends along the second direction Y, and the second positioning bump part 234*b* extends along the third direction Z. When each of the positioning bump members 234 is disposed in the corresponding positioning slot 1012, the first positioning bump part 234*a* of each of the positioning bump members 234 would cooperate with the first slot part 1012*a* of the corresponding positioning slot 1012 to restrict the board end connector 1 and the wire end connector 2 only to move in the second direction Y relatively, and the second positioning bump part 234*b* of each of the positioning bump members 234 would cooperate with the second slot part 1012*b* of the corresponding positioning slot 1012 to restrict the board end connector 1 and the wire end connector 2 only to move in the third direction Z relatively. Thus, the wire end plugging bump member 21 of the wire end connector 2 can be accurately inserted into the accommodating groove 103 of the board end connector 1.

The board end plugging surface 101 of the board end insulating body 10 of the board end connector 1 of this embodiment further comprises a guiding groove 1013, which is disposed between the two positioning slots 1012. In this embodiment, the wire end plugging surface 231 of the wire end insulating body 23 of the wire end connector 2 is also provided with a guiding plate 235 protruding from the wire end plugging surface 231 along the first direction X. The orthographic projection of the guiding plate 235 projected to the wire end plugging surface 231 is in the wire end plugging surface 231. The guiding plate 235 could guide the board end connector 1 to be connected with the wire end connector 2.

In this embodiment, the guiding plate 235 is disposed between the two positioning bump members 234. The length of the guiding plate 235 protruding from the wire end plugging surface 231 is longer than the length of each of the positioning bump members 234 protruding from the wire end plugging surface 231. When the board end connector 1 is connected to the wire end connector 2, the guiding plate 235 of the terminal connector 2 would be inserted into the guiding groove 1013 of the terminal connector 1 before the positioning bump member 234 of the wire end connector 2 is inserted into the positioning slot 1012 of the board end connector 1. The guiding plate 235 of the wire end connector 2 would cooperate with the guiding groove 1013 of the board end connector 1 to initially position to ensure that the wire end connector 2 is inserted into the board end connector 1 in the correct direction. Then, the positioning bump member 234 of the wire end connector 2 can be inserted into the positioning slot 1012 of the board end connector 1 to avoid damage due to oblique insertion when the board end connector 1 is connected with the wire end connector 2. In this embodiment, the latch accommodating groove 233 extends to the guiding plate 235.

In summary, the present disclosure provides a board end connector and a connector assembly. By connecting the plugging bump member of the housing with the plugging slot of the board end insulating body while the interfering bump of the plugging bump member interferes with the interference sidewall of the plugging groove, the retaining force holding the housing and the board end insulating body can be increased. Thus, the housing can be firmly connected with the board end insulating body and can be effectively prevented from detaching from the board end insulating body.

In the present disclosure, through the cooperation of a plurality of recesses of the terminal insulating body and a plurality of bumps of the conductive gel, the distance between the conductive gel and the plurality of ground terminals can be reduced to effectively improve the electromagnetic shielding performance of terminal components. A positioning member is disposed in the accommodating groove of the board end insulating body, and a first positioning part on the positioning member cooperates with the second positioning part of the conductive colloid of each of the terminal components to secure the terminal component in the accommodating groove of the board end insulating body.

Besides, since a plurality of positioning bump members of the wire end connector are connected with a plurality of positioning recesses of the board end connector, the wire end connector can be accurately connected to the board end connector to avoid damage caused by oblique insertion during the connection of the wire end connector and the board end connector. The plurality of positioning bump members and the plurality of positioning recesses are respectively disposed in the opposite plugging surface of the wire end connector and the plugging surface of the board end connector. Thus, the size of the wire end connector and the board end connector would not be increased.

It is to be understood that the term "comprises", "comprising", or any other variants thereof, is intended to encompass a non-exclusive inclusion, such that a process, method, article, or device of a series of elements not only comprise those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A board end connector, comprising:

a board end insulating body comprising a board end plugging surface and a plugging slot, the plugging slot being disposed on the board end plugging surface, the plugging slot comprising two interference sidewalls oppositely disposed;

a terminal module disposed in the board end insulating body; and a housing disposed on one side of the board end insulating body, a plugging bump member being provided on one side of the housing, the plugging bump member being disposed in the plugging slot, an interfering bump being provided on at least one side of the plugging bump member, the interfering bump interfering with at least one of the two interference sidewalls;

wherein one side of the interfering bump close to the board end plugging surface is provided with a limiting surface; the extending direction of the limiting surface intersects with the extending direction of the two interference sidewalls; one side of the interfering bump away from the board end plugging surface is further provided with a guiding inclined surface;

wherein the one side of the housing close to the board end plugging surface is provided with a first opening; the board end plugging surface is exposed from the first opening; the board end plugging surface comprises a positioning slot; the positioning slot is configured to be connected to a positioning bump member of a wire end connector;

wherein the board end plugging surface comprises two positioning slots oppositely disposed; the two positioning slots are symmetrically disposed with the centerline of the board end plugging surface as the symmetric center; the two positioning slots are in a shape of inverted L.

* * * * *